United States Patent [19]

McAlister

[11] 4,261,338
[45] Apr. 14, 1981

[54] LAPPED SOLAR PANEL ROOF INSTALLATION

[76] Inventor: Roy E. McAlister, 5285 Red Rock North, Phoenix, Ariz. 85018

[21] Appl. No.: 32,634

[22] Filed: Apr. 23, 1979

[51] Int. Cl.³ .............................................. F24J 3/02
[52] U.S. Cl. .................................... 126/450; 126/448
[58] Field of Search ......... 126/446, 448, 450, DIG. 2; 52/536, 553; 237/1 R

[56] References Cited

U.S. PATENT DOCUMENTS

| | | | |
|---|---|---|---|
| 4,111,188 | 9/1978 | Murphy, Jr. | 126/446 |
| 4,144,874 | 3/1979 | Zebuhr | 126/448 |

Primary Examiner—George T. Hall
Attorney, Agent, or Firm—Cushman, Darby & Cushman

[57] ABSTRACT

A solar panel installation comprising a plurality of solar panel structures each having a multiplicity of elongated thin wall sections defining a multiplicity of parallel passages extending between the ends of the panel structure, a plurality of mounting assemblies for mounting the plurality of panel structures on an exterior building surface having at least a vertical component of extent in parallel side-by-side relation so that an uppermost panel structure and a lowermost panel structure have uppermost and lowermost marginal side portions extending parallel to one another in the direction of extent of said passages and each pair of adjacent panel structures includes a lower marginal side portion overlapping an upper marginal side portion, a plurality of manifold tubes extending along the ends of the panel structures communicating with the ends of certain passages of each panel structure, and a coupling assembly connecting adjacent ends of adjacent tubes.

28 Claims, 14 Drawing Figures

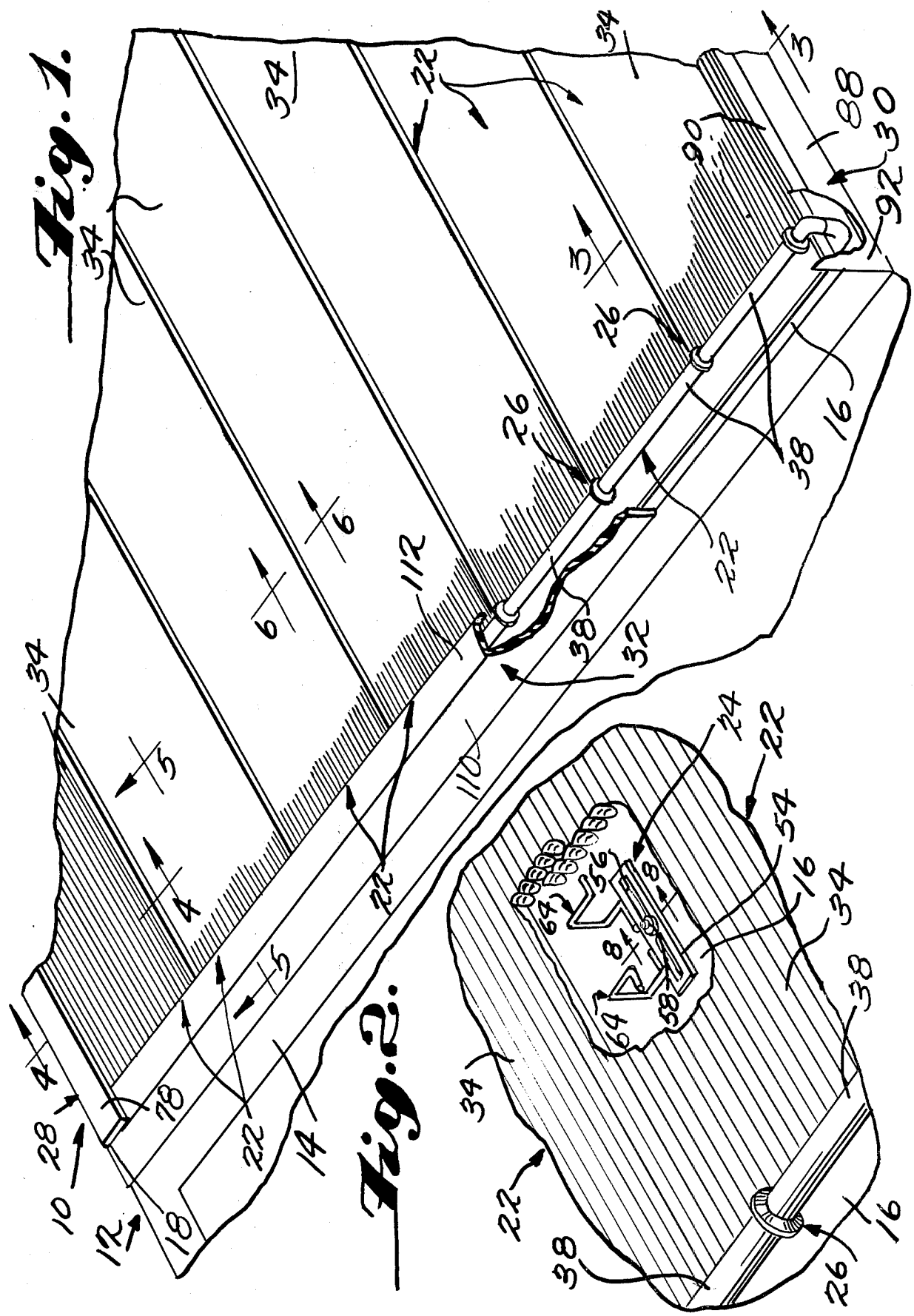

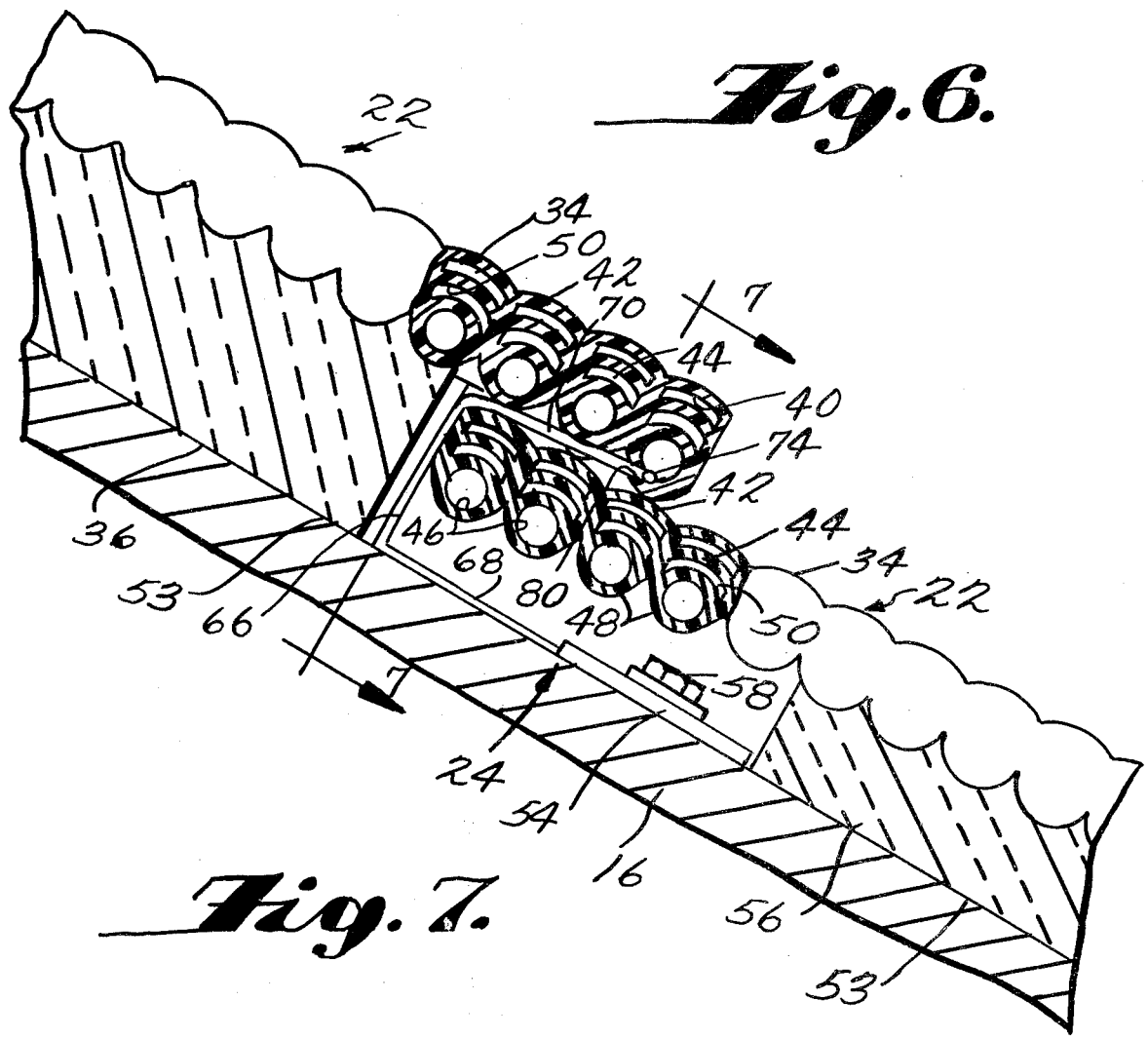
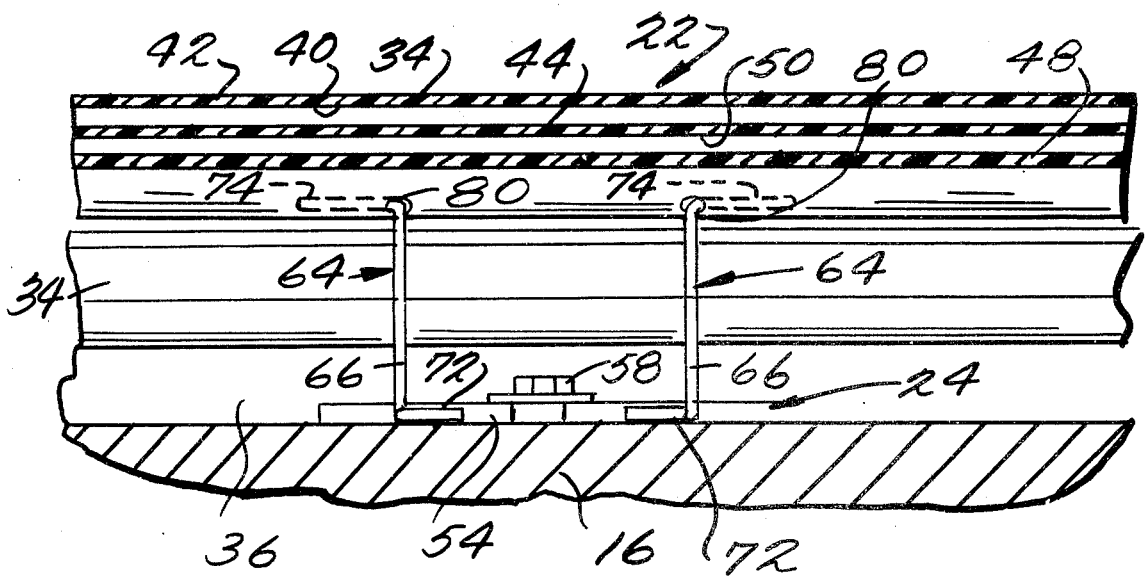

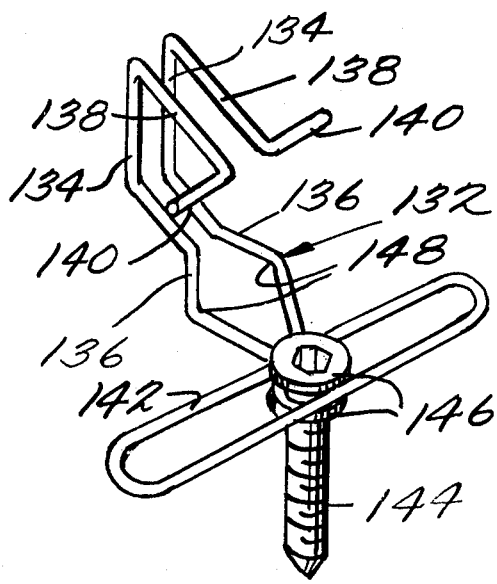
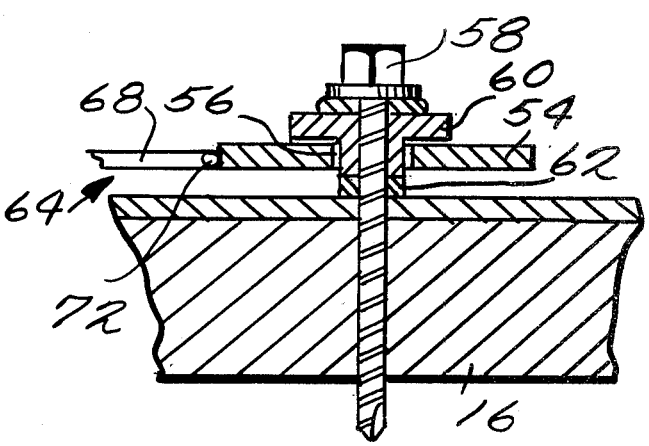
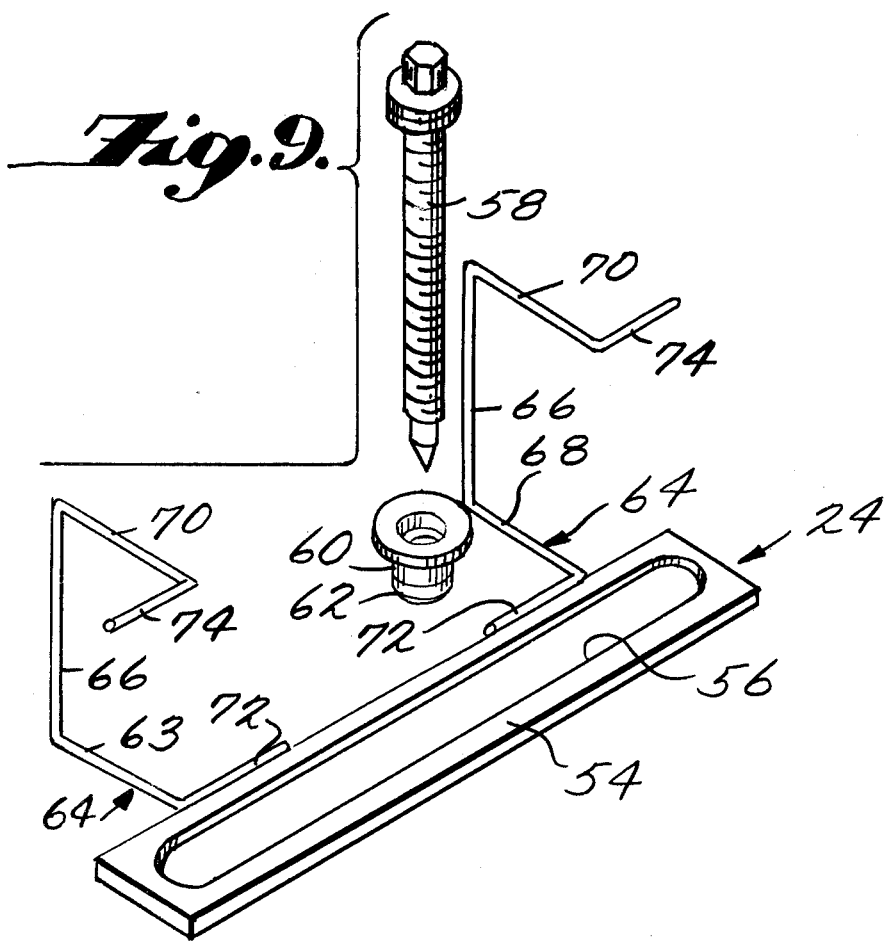

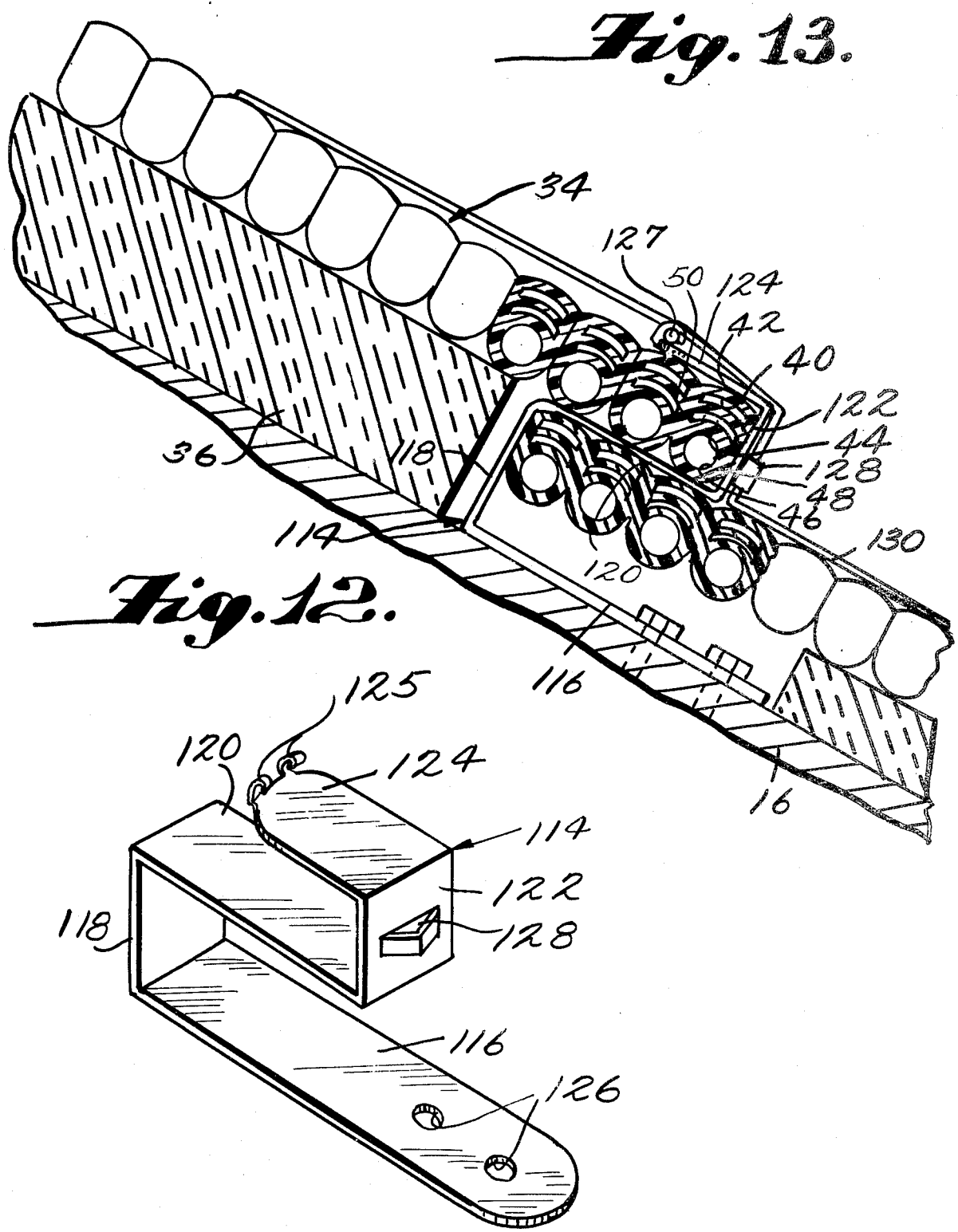

LAPPED SOLAR PANEL ROOF INSTALLATION

This invention relates to solar energy, and more particularly to improvements in exterior building surface installations of solar panels such as roof installations and siding installations.

In my co-pending application Ser. No. 860,779 filed Dec. 15, 1977, entitled RADIANT ENERGY HEAT EXCHANGER SYSTEM, there is disclosed a solar panel assembly which includes a panel structure extruded from a thermoplastic resin material. The panel structure thus formed includes a multiplicity of elongated thin wall sections which are integrally joined to form a multiplicity of elongated parallel passages. In a preferred embodiment of the panel structure the passages are arranged in three side-by-side layers or rows, the top row of passages being defined along their upper surfaces by elongated thin wall sections having an upwardly arching lens-shaped cross-sectional configuration. The lower surfaces of the top row of passages are defined by similar lens-shaped thin wall sections. The lower passages of the panel structure are defined essentially by generally cylindrical wall sections, the upper arcuate wall sections thereof defining the lower surfaces of intermediate passages, the upper surfaces of which are defined by the lower lens-shaped wall sections.

As disclosed in the aforesaid application, a panel structure of this type is particularly desirable because its overall thickness is such that it can very efficiently serve as the outer surface material for a roof. In the aforesaid application there is disclosed an insulation in which the panels are mounted on a roof surface to provide a finished decorative appearance to the roof, the panel structure being oriented so that the passages thereof extend in a direction from the ridge of the roof to the gutter. The application also discloses means to effect the joint between side-by-side panels thus installed as well as manifolding arrangements for the open ends of the panel structures at the ridge and at the gutter.

It has been found that a highly efficient and aesthetically desirable roof configuration can be provided by mounting panel structures of the type disclosed in my aforesaid application, so that the orientation of the passages within the panels is in a direction across the roof as distinguished from the ridge-to-gutter direction disclosed in my earlier application. Very often, the width dimension of a roof greatly exceeds the dimension from ridge to gutter, and consequently it becomes possible by orienting the panel structures in accordance with the principles of the present invention to effect a total installation with a lesser number of panel sections. In addition, by utilizing the panel structures in this orientation, it becomes possible in accordance with the principles of the present invention to provide lapped joints between adjacent panel structures so that there is presented in the final installation a roof structure having a most pleasing and desirable aesthetic appearance.

Moreover, it is an object of the present invention to also provide improved means for effecting the securement of the panel structure to the roof surface and the interconnection of adjacent panel structures with one another including the aforesaid lapped connection and an improved connection between the adjacent ends of manifold pipes of adjacent panel assemblies. An important feature of the mounting means provided by the present invention is that it enables the installation to proceed from the ridge of the roof to the gutter of the roof, rather than the usual manner of mounting shingles on a roof where the installation proceeds from the gutter to the ridge. This arrangement greatly facilitates the mounting of the installation, since it is possible for the installers to position themselves on the roof surface of a pitched roof at a position below the panel structure which is being mounted, rather than requiring the installers to be on the pitched roof above the panel structure which is being mounted.

These and other objects of the present invention will become more apparent during the course of the following detailed description and appended claims.

The invention may best be understood with reference to the accompanying drawings, wherein an illustrative embodiment is shown.

In the drawings:

FIG. 1 is a fragmentary perspective view of a portion of a solar panel assembly roof installation embodying the principles of the present invention;

FIG. 2 is an enlarged fragmentary perspective view with parts broken away illustrating one embodiment of a fastening assembly for securing successive panels;

FIG. 6 is a fragmentary sectional view taken along the line 6—6 of FIG. 1;

FIG. 7 is a fragmentary sectional view taken along the line 7—7 of FIG. 6;

FIG. 8 is a fragmentary sectional view taken along the line 8—8 of FIG. 2;

FIG. 9 is an exploded perspective view of the panel mounting assembly shown in FIG. 2;

FIG. 12 is a view similar to FIG. 6 illustrating still another form of panel mounting assembly;

FIG. 13 is a perspective view of strap shown in the assembly of FIG. 12; and

FIG. 14 is a perspective view of modified form of panel mounting assembly embodying the principles of the present invention.

Figure 3:
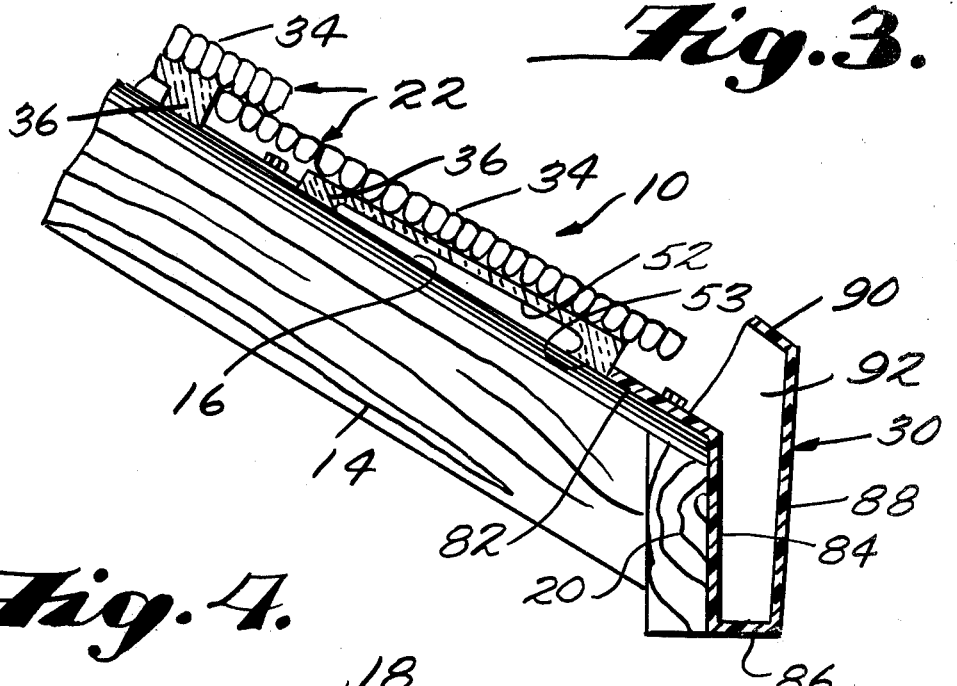
FIG. 3 is an enlarged fragmentary cross-sectional view taken along the line 3—3 of FIG. 1.

Referring now more particularly to the drawings, there is shown in FIGS. 1 and 2 thereof a solar panel assembly roof installation, generally indicated at 10, which embodies the principles of the present invention. The installation 10 is mounted on a roof construction although the installation 10 may be mounted on a vertical wall as a siding installation if desired. Moreover, the installation may be provided in conjunction with an existing finished roof or wall or it may be provided as the finishing installation of a new roof or wall. For purpose of exemplifying the principles of the present invention, the installation 10 shown in FIG. 1 illustrates portions of a conventional pitched roof construction, generally indicated at 12. Illustrated in the drawings are roof truss portions 14 and an exterior layer of material mounted thereon defining a pair of pitched roof surfaces 16. The pitched roof surfaces 16 are shown in the drawings as provided a smooth planar exterior surface. This showing is schematic only as the actual surface in situations where the installation 10 is on an existing roof will be one in which the exterior surface is provided by shingles and therefore is not a smooth planar surface but rather one which has a shingled effect as is well known.

Figure 4:
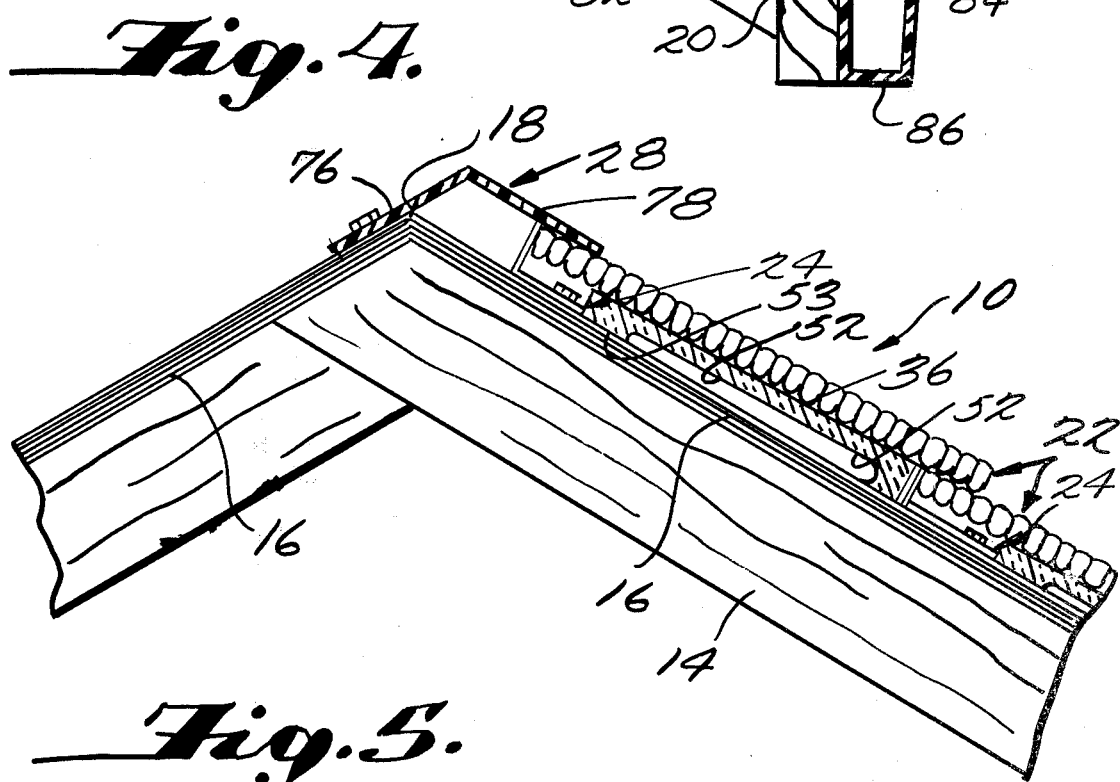
FIG. 4 is an enlarged fragmentary cross-sectional view taken along the line 4—4 of FIG. 1.

The roof construction as shown includes an upper ridge 18 and a lower gutter board 20 which is best shown in FIGS. 3 and 4. As previously indicated between the ridge 18 and the gutter board 20, the roofing material 16 presents one downwardly sloping surface presented most advantageously to receive environmentally available solar energy which for present purposes may be regarded as a planar surface even though it is of irregular shingled configuration.

The installation 10 of the present invention includes, in general, a plurality of elongated solar panel assemblies 22 which are mounted on the roof surface 16 so as to extend in a direction parallel to the ridge 18 and gutter board 20 with adjacent panel assemblies disposed in lapped relation. The installation 10 also includes a plurality of panel mounting and securing assemblies 24 which serve to mount the panels on the roof surface in the lapped relation aforesaid and to secure the same thereon against movement out of mounted relationship. The installation also includes a multiplicity of manifold tube coupling assemblies 26 which serve to provide communicative leak-proof connections between adjacent ends of adjacent manifold tubes of the solar panel assemblies 22. Also contemplated within the installation 10 are suitable trim strips such as a ridge trim strip 28, a gutter trim strip 30 and side trim strips 22.

Each of the solar panel assemblies 22 includes an extruded panel structure 34, a layer or pad 36 of insulating material mounted thereunder and a manifold tube 38 fixedly secured to each end of the panel structure 34. It will be understood that the panel structure may assume any desirable configuration, however, in the preferred embodiment herein shown the panel structure 34 is constructed in accordance with the teachings contained in my co-pending U.S. application Ser. No. 860,779 filed Dec. 15, 1977, and is made with the apparatus and method disclosed in my co-pending application Ser. No. 6,754 filed Jan. 26, 1979. Accordingly, the disclosure of both of these patent applications is hereby incorporated by reference into the present specification. For present purposes it is sufficient to note that the panel structure 34 consists of a single extrusion of an appropriate thermoplastic material, such as polycarbonate, the extrusion constituting essentially a multiplicity of integrally interconnected elongated thin wall sections defining a multiplicity of parallel passages.

As best shown in FIG. 6, the passages are arranged in side-by-side rows and include a row of side-by-side outer passages 40 defined by thin wall sections including outer thin wall sections 41 of outwardly arching lens-shaped cross-sectional configuration. The lower portions of the passageways 40 are defined by thin wall sections 44 which are similarly of lens-shaped configuration. The panel structure 34 also provides a row of side-by-side lower passages 46 which are defined by generally cylindrical thin wall sections 48. A row of side-by-side intermediate passages 50 is provided between the upper passages 40 and lower passages 46, and have their upper surfaces defined by the intermediate thin wall sections 44 and thier lower surfaces defined by the uper portion of the cylindrical thin wall sections 48.

Again, while the panel structure 34 may be manifolded in any of the arrangements disclosed in the aforesaid application, in the preferred embodiment shown, manifolding is accomplished so as to utilize the lower passages 46 and specifically only the lower passages 46 which are disposed in the central portion of the panel structure 34. Thus, in the preferred embodiment shown, all of the upper passages 40 and intermediate passages 50 are sealed at their ends and provide insulating space. Similarly, the three lower passages 46 at each marginal side of the panel structure are likewise sealed at their ends and provide dead air space. Manifolding is accomplished by providing appropriate openings in a side wall of a polycarbonate tube 38 and heat sealing the same to the adjacent end of the polycarbonate panel structure 34 with the openings in the tubes communicating with the adjacent open ends of the central lower passages 46 of the panel structure. The heat sealing is preferably accomplished by utilizing the method and apparatus disclosed in my co-pending application Ser. No. 32,635, entitled METHOD AND APPARATUS FOR MANIFOLDING MULTIPLE PASSAGE SOLAR PANEL the disclosure of which is hereby incorporated by reference into the present specification.

It is important to note that the openings must be formed in the side wall of the tube 38 so that their axes are disposed within a common plane which is at a slight angle with respect to a plane passing through the axis of the manifold tube. A preferred angular relationship is approximately 3°/0′. This angular relationship is provided for the purpose of accommodating the lapped relationship of the panel structures when mounted on the roof construction. In this regard, it will be noted that the insulating pad 36 is of generally wedge-shaped cross-shaped configuration and is mounted beneath the extruded panel structure throughout the central portion thereof. That is, the marginal sides of the insulating pad 36 terminate in spaced relation from the adjacent side of the panel so that when viewing a single panel assembly a marginal side portion of the panel structure extends outwardly beyond the adjacent sides of the insulation pad at both sides of the assembly. Also, it will be noted that it is preferable to provide the insulating pad 36 with generally square-shaped recesses 52 in the central portion thereof opening to a planar lower surface 53 thereof. The recesses 52 are provided primarily for the purpose of shipping convenience in that they are deep enough to receive the parts of the mounting and securing assembly 24 and coupling assembly 26.

It will be understood that the insulating pad may be separately formed and adhered to the underside of the panel structure or it may be molded in place, as shown, in which case it will conform to the irregular lower surface configuration provided by the panel structure. The wedge-shaped cross-sectional configuration of the pads 36 when the lower surfaces 53 thereof are engaged with the exterior roof surface 16, orient the associated panel structure 34 so that the row of passages 46 extend in a plane which is disposed at an angle with respect to the roof surface and the generally parallel axes of the tubes 38. As before, a preferred angle is approximately 3°/0′. In this way the upper marginal side of each panel structure 34 when mounted on the roof surface 16 assumes a position closer to the roof surface than the lower marginal side portion thereof thus accommodating the overlapping relationship between adjacent panel structures.

Referring now more particularly to FIG. 2, it will be noted that the mounting and securing assembly 24 shown therein permits the installation 10 to be one which is proceeded with from the ridge 18 in a direction toward the gutter board 20. Basically, each mounting and securing assembly 24 provides a connection between the lower marginal side portion of the panel assembly and the roof construction. The arrangement also accommodates the make-up of the lapped arrangement by simply slidably receiving the upper marginal side portion of the next panel assembly to be mounted in a lapped relationship with respect to the lower overhang of the lower side marginal portion of the upper panel assembly, which has previously been mounted.

With particular reference to FIGS. 2 and 6-9, each panel mounting and securing assembly 24 includes an elongated generally rectangularly shaped mounting bar or plate 54 having an elongated slot 56 formed therein. The mounting bar 54 is adapted to be attached to the exterior surface 16 of the roof construction by a fastener assembly which includes a bolt or lag screw 58 adapted to extend through a flanged sleeve 60 and a rubber sealing washer 62, and then into the material forming the roof surface 16. The main body of the flanged sleeve 60 fits loosely within the slot 56 and when the lag screw 58 is tightened into the roof surface 16, resilient washer 62 prevents leakage through the hole made by the periphery of the screw shank. In FIG. 8 the assembly is shown just prior to any pressure being applied to the washer 62 which will deform in a radial direction when pressure is applied by tightening the lag screw. The flange 60 loosely holds the mounting plate 54 from any appreciable upward movement.

Rigidly secured to the forward edge of the mounting plate 54 at each end portion thereof is a bent spring wire, generally indicated at 64. Each spring wire 64 includes an intermediate U-shaped section including a bight portion 66 and two leg portions 68 and 70. Formed integrally on the free end of each lower leg portion 68 and extending inwardly at right angles therefrom is an attaching portion 72 which is welded or otherwise rigidly secured to the adjacent end portion of the mounting plate 54. As shown attaching portions 72 extend in opposite directions and in generally longitudinally aligned relation with respect to one another. The free end of each upper leg portion 70 is formed with an integral panel engaging portion 74 which extends at right angles therefrom in a direction opposed to the direction of extent of the attaching portion 72. Here again the panel engaging portions 74 extend in opposite directions and in generally longitudinally aligned relation with respect to one another.

It can thus be seen that when the mounting plate is held on the surface 16 of the roof construction, the U-shaped portions of the spring wires 64 will extend toward the ridge 18 of the roof construction, thus providing recesses to receive the upper marginal side portion of the next lower panel assembly to be mounted on the roof. To start the installation, the ridge trim member 28 is mounted which consists essentially of an elongated angular extrusion of any suitable material, such as PVC plastic or aluminum. Member 28 includes one flat panel portion 76 which is suitably fixed at the ridge 18 of the roof on the sloping surface thereof opposed from that on which the panels are to be mounted. The ridge trim member 28 also includes an angular panel portion 78 which is disposed in spaced parallel relation with the surface 16 of the roof construction material to which the panels are to be mounted. If desired, a plurality of mounting and securing assemblies 24 is mounted adjacent the ridge at a position beneath the plate portion 78 so as to provide a stop and additional hold down for the upper marginal side portion of the uppermost panel assembly to be mounted on the roof. It will be noted that the upper marginal side portion of the panel structure which extends beneath the overlapped sections of the trim plate portion 78 is generally equal to the corresponding extent of the three uppermost lower passages 46. The number of mounting assemblies 24 utilized will, of course, depend upon the width of the roof and the corresponding length of the panel assemblies utilized. An exemplary spacing would be on 72 inch centers. It is preferable to initially mark the roof surface with horizontal chalk lines indicating the lines along which the lag screws 58 of the mounting assemblies 24 should be mounted on the material defining the roof surface 16.

After the upper marginal side portion of the uppermost panel assembly has been mounted in position, as indicated above, a series of mounting and securing assemblies 24 is then screwed in place along the chalk line therefor and each is mounted in cooperative relationship with respect to the lower marginal side portion of the first uppermost panel assembly. To this end, there is formed in the thin wall sections 48 defining the lower passage 46 adjacent the lower marginal side of the panel structure 22 a series of openings 80 of a size to permit the panel engaging end portions 74 of the spring wire 64 to be engaged therein. As best shown in FIG. 7, two openings 80 are provided in the panel for each assembly 24, the spacing between the opening being generally equal to the space between the leg portions 70 of the spring wires 64 provided by the assembly 24. The panel engaging end portions 74 are inserted within the openings by pinching together the leg portions 70 until the ends of the portions 74 are positioned to engage the openings. Thereafter the leg portions are released permitting the leg portions to spring back into a position engaging the entire portions 74 within the openings 80. It will be understood that the mounting assemblies 24 can be vertically engaged within the panel structure and then screwed to the material of the roof surface 16, if desired, since ready access to the lag screw 58 is provided.

After all of the mounting assemblies 24 have been installed, as indicated above, there will be presented a recess below the lower marginal side portion of the uppermost panel assembly which has been installed for receiving the upper marginal side portion of the next lower panel assembly to be installed. The installation then proceeds in this fashion until the lowermost panel assembly is installed, at which time the gutter trim 30 is suitably mounted along the gutter board 20 of the roof construction. The gutter trim 30 may be of any suitable construction and, as shown, constitutes an extrusion of plastic or aluminum, as before, having first wall portion 82 adapted to be attached to the lower surface 16 of the roof construction beneath the overhanging lower marginal side portion of the lowermost panel assembly, three wall portions 84, 86 and 88 defining a trough-shaped configuration and an upper angular wall portion 90 extending from the free edge of the wall portion 88 so as to generally guard the overhang of the lowermost panel. It will be understood that the ends of the extrusion are suitably closed as by end walls 92 and that downsprouts (not shown) are connected at appropriate places, all in accordance with conventional procedure.

Preferably, as each solar panel assembly is installed beginning at the ridge 18, the open ends of the manifold tubes 38 at each end of the panel assembly are appropriately connected. In this regard, the upper open end of the uppermost manifold tubes may simply be plugged. Within the lower open end of each manifold tube 38 of the initial uppermost panel assembly, a coupling assembly 26 is engaged.

Figure 11:
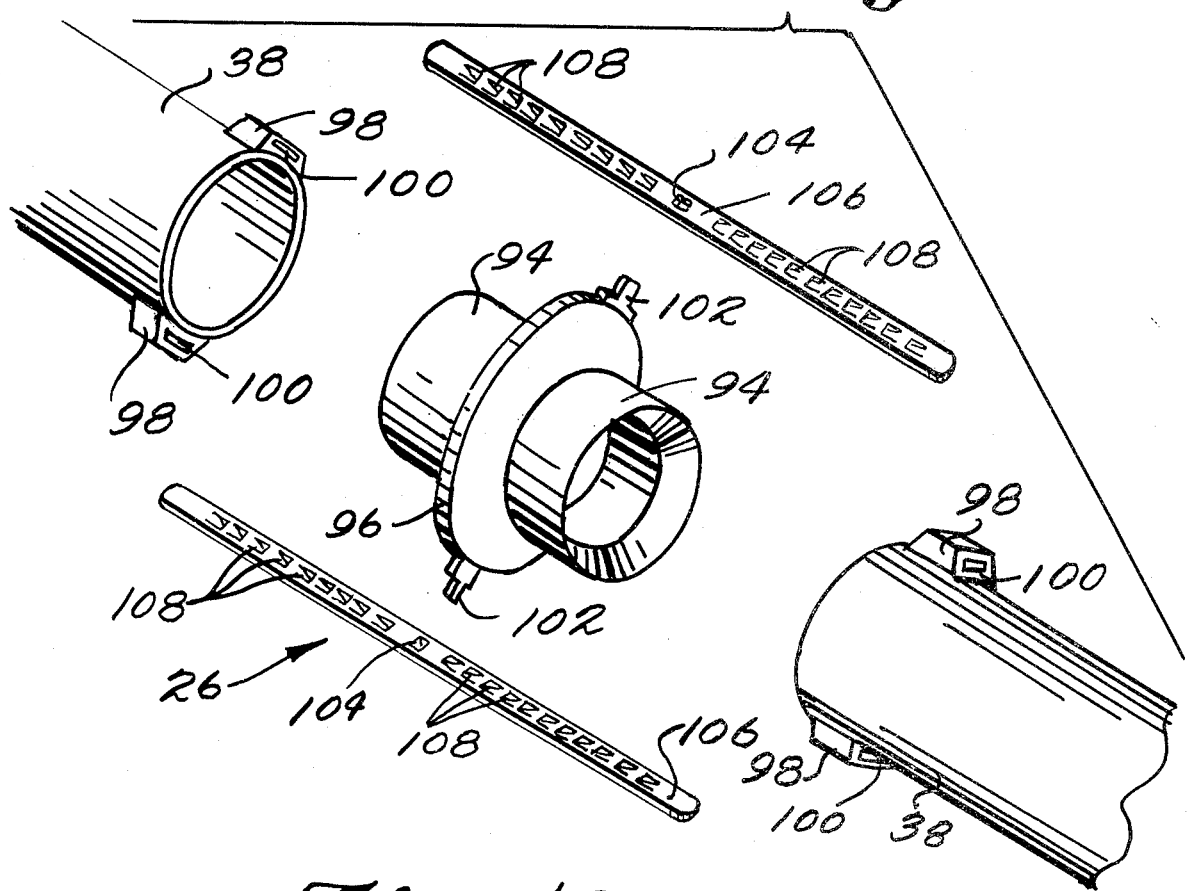
FIG. 11 is an exploded view of the coupling assembly shown in FIG. 10.
Figure 10:
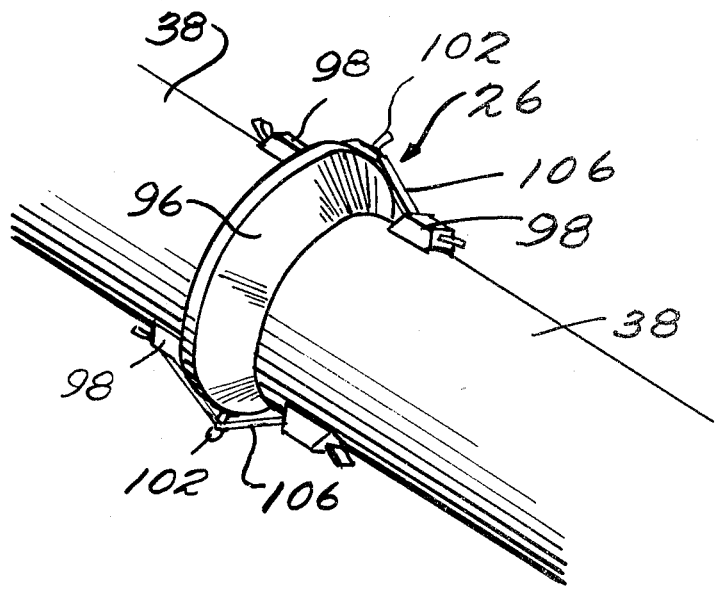
FIG. 10 is a perspective view illustrating a coupling assembly between the adjacent open ends of two manifold tubes embodying the principles of the present invention.

As best shown in FIGS. 10 and 11, each coupling assembly 26 includes a tubular connecting member 94 having a flange 96 extending radially outwardly from the central exterior periphery thereof. Preferably, flange 96 is of U-shaped cross-sectional configuration to provide an appropriate temperature expansion and contraction section. The exterior peripheral size of the tubular member 94 is such that each end portion thereof will fit within an open end of an associated manifold tube 38. Rigidly secured to the exterior periphery of the end of the manifold tube is a pair of diametrically opposed lugs 98, each having a longitudinally extending slot 100 extending therethrough. Lugs 98 are shown fused to the tube wall. It will be understood that any manner of securement can be utilized including separate straps or integrally molding the same with the tube. Flange 96 has a pair of diametrically opposed lugs 102 formed thereon which extend radially outwardly. Each of the lugs 102 is adapted to engage within a central opening 104 formed in a strap 106. As best shown in FIG. 12, after the lug 102 has been engaged within the opening 104 of the strap 106, the lug can be twisted to prevent removal. The strap is of a size to engage within an associated slot 100 and has a series of barb-like tabs 108 thereon. The strap may be formed of stainless steel in which case the tabs are struck from the surface thereof. Alternatively, the strap may be of a suitable plastic material (e.g., PVDF) in which case tabs 108 are molded in the configuration shown. The tabs include locking surfaces facing in a direction toward the center opening 104 and inclined surfaces extending from the edges of the locking surfaces in a direction away from the opening 104 to the surface of the strap.

After the strap end portion has been inserted through the associated slot 100 and the end thereof pulled an associated tab 108 will deflect out of the slot to present its plane of the strap locking surface to the lug and thus provide a ratchet-like securement between the lugs 102 and 98 when the tubular connecting member 94 has been moved inwardly to a point sufficient to engage the end of the manifold tube 38 on flange 96. After both straps have been thus engaged, the lower end of the associated manifold tube 38 has secured thereto the coupling assembly 26 with the lower end portions of the tubular member 94 in positions to have engaged thereover the open upper end of the associated manifold tube of the next panel assembly to be installed. After each manifold tube 38 is engaged over the associated lower end portion of the tubular member 94, the other end portions of the straps 106 are engaged with the associated slot 100 formed in the lugs 98 on the associated end of the manifold tube 38. The securement proceeds as previously indicated with the locking surfaces of the barb-like tabs 108 engaging the lugs 98 and effecting final securement.

Figure 5:
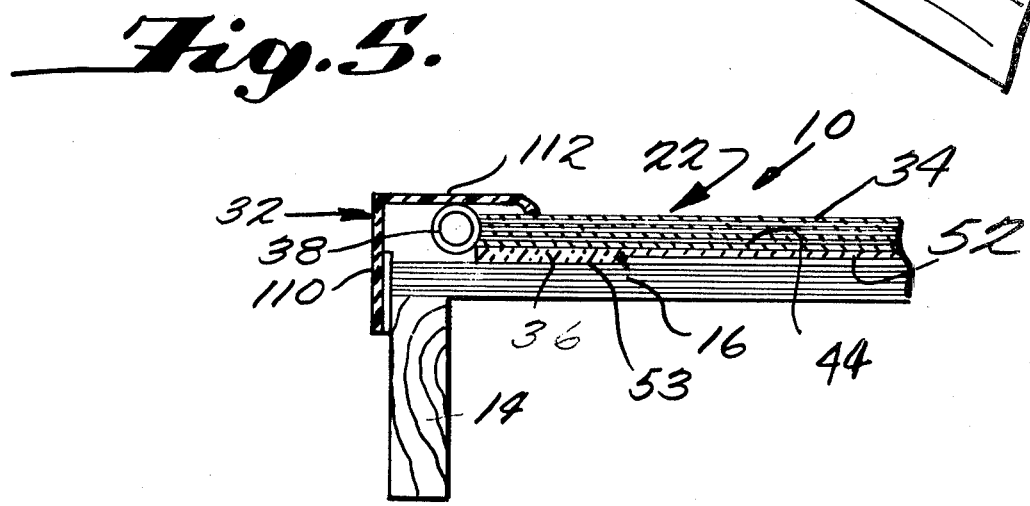
FIG. 5 is an enlarged fragmentary cross-sectional view taken along the line 5—5 of FIG. 1.

The arrangement is such that by cutting off the excess of the straps extending beyond the engaged tabs after installation, it becomes quite difficult to disengage the tabs, thus rendering it necessary to cut the straps to effect disengagement. Such an arrangement is considered desirable in that it discourages tampering and disassembly of the installation once it is installed. The installation is completed by installing the gutter trim strip 30 as previously indicated and then mounting the side trim strips 32 which, as shown in FIGS. 1 and 5, consist essentially of an extruded member having angular plate portions 110 and 112 arranged so that one is suitably engaged with the end edge of the roof construction and the other extends over the manifold tubing in lapped relation to the adjacent end of the panel assemblies.

It will be understood that other mounting arrangements may be provided which will achieve similar effectiveness from the standpoint of enabling the panels to have freedom to expand and contract under changing temperature conditions while insuring retention under severe wind conditions. For example, in FIGS. 12 and 13 there is shown a mounting and securing assembly, generally indicated at 114, which can be utilized in lieu of the assembly 24 previously described. The assembly 114 consists essentially of a single strip of spring metal bent to provide a roof attaching portion 116, a vertical bight portion 118 extending upwardly from one end thereof, a parallel leg portion 120 extending at right angles from the bight portion 118 in the direction of extent of the attaching portion 116, a second bight portion 122 extending upwardly from the opposite end of the leg portion 120, and a final leg portion 124 extending from the upper edge of the bight portion 122 in a direction toward the bight portion 118. As best shown in FIG. 10, the strip is readily mounted in operative relationship with respect to the lower marginal edge portions of the first panel to be installed and the roof surface by moving the strip upwardly so that the lower side marginal portion of the mounted panel assembly engages between the leg portion 124 and 120. The attaching portion 116 can then be secured to the roof surface material 16 by engaging a suitable fastener through openings 126 formed in the attaching portion at positions outwardly of the bight portion 122.

It will be noted that the bight portion 122 has a central section thereof bent outwardly to provide an opening 128 of a size to receive therethrough a final securing wire 130. Wire 130 is bent to engage the upper surface of the associated lapped panel structures and is provided to give additional holding strength to resist dislodgement under extreme wind conditions. Securing wire 127 is threaded longitudinally over the upper surface of the lap area, through rolled openings 125 of 116. While assembly 114 is simple and economical, it does suffer aesthetically in comparison with assembly 24 since there are exteriorly exposed portions after installation with the assembly 114 which is not the case with assembly 24.

In FIG. 14 there is shown still another form of panel mounting assembly 132 which achieves the aesthetic advantages of the assembly 24 and provides for somewhat simpler connection to the roof structure during installation. The assembly 132 is particularly useful in siding installations. As shown, the assembly 132 is similar to the assembly 24 in that it includes a pair of U-shaped spring wire elements bent to provide bight portions 134, lower leg portions 136 and shorter upper leg portions 138 terminating in panel engaging portions 140, serving the same function as 74 previously described. However, instead of being fixed to a mounting bar, the free ends of the lower leg portions 136 are are integrally joined by an open elongated loop portion 142. Mounting assembly 132 also includes a lag screw 144 which has a double flanged head 146.

The mounting assembly 132 has the advantage that the panel engaging portions 140 can be engaged in operative relation with the panel assembly at the factory and shipped to the installation site in such operative relation. Lug screw 144 can be separately screwed into the material defining the roof surface 16 so as to leave the double flanged heads 146 thereabove. Interconnection between each bent wire structure and an associated screw is simply accomplished by lowering the bowed out sections 148 of the lower leg portions 136 over the double flanged head 146 and then moving the leg portions toward the ridge causing the integral ends of the open loop portion 142 to spread and capture the head within the central portion of the open loop as shown. Thermal expansion of the attached panel is thus allowed while maintaining secured attachment against wind and other normal surface loadings.

It thus will be seen that the objects of this invention have been fully and effectively accomplished. It will be realized, however, that the foregoing specific embodiments have been shown and described only for the purpose of illustrating the principles of this invention and are subject to extensive change within departure from such principles. Therefore, this invention includes all modifications encompassed within the spirit and scope of the following claims.

What is claimed is:

1. A solar panel installation comprising
    a plurality of solar panel structures each having a multiplicity of elongated thin wall sections defining a multiplicity of parallel passages extending between the ends of said panel structure,
    means mounting said plurality of panel structures on an exterior building surface having at least a vertical component of extent in parallel side-by-side relation so that an uppermost panel structure and a lowermost panel structure have uppermost and lowermost marginal side portions extending parallel to one another in the direction of extent of said passages and each pair of adjacent panel structures includes a lower marginal side portion overlapping an upper marginal side portion, and
    manifold tube means extending along the ends of said panel structures communicating with the ends of certain passages of each panel structure.

2. A solar panel installation as defined in claim 1 wherein
    said multiplicity of parallel passages in each of said panel structures includes a row of passages disposed in side-by-side relation between opposite sides of said panel structure, and said manifold tube means includes a manifold tube having a length generally equal to the side-to-side dimensions of each panel structure extending along each end of each panel structure with its axis disposed at an angle to the side-by-side extent of said row of passages, and means for fixedly securing each of said manifold tubes to the adjacent panel structure end so that the interior thereof is out of communicating relation with a plurality of passages in said row at each side of said panel structure and in communicating relation with the adjacent ends of the remaining passages of said row.

3. A solar panel installation as defined in claim 2 wherein said thin wall sections of each panel structure include exterior side-by-side thin wall sections defining a portion of said row of passages, the exterior thin wall sections defining the remaining passages of said row having a layer of insulating material secured exteriorly thereto, said layer of insulating material having an exterior mounting surface extending in a plane generally parallel with a plane passing through the axes of the associated manifold tubes.

4. A solar panel installation as defined in claim 3 wherein each layer of insulating material has central recess means formed therein opening to the associated mounting surface.

5. A solar panel installation as defined in claim 4 wherein said multiplicity of passages associated with each panel structure includes a second row of passages sealed at their ends of a number generally equal to the number of passages in said first mentioned row, said multiplicity of thin wall sections including an exterior thin wall section having an outwardly arching lens-shaped cross-sectional configuration defining a part of each one of the passages of said second row.

6. A solar panel installation as defined in claim 5 wherein said multiplicity of passages associated with each panel structure includes a corresponding third row of passages sealed at their ends between said first and second rows.

7. A solar panel installation as defined in claim 2, 3, 4, 5 or 6 wherein the axes of said manifold tubes are disposed at an angle of approximately 3°0′ to the side-by-side extent of the associated first mentioned row of passages.

8. A solar panel installation as defined in claim 1, 2, 3, 4, 5 or 6 wherein said mounting means includes a plurality of mounting assemblies between each panel structure and the exterior building surface, each of said mounting assemblies comprising a pair of side-by-side U-shaped spring wire elements for receiving an upper marginal side portion of a lower solar panel structure therein, said wire elements including first and second pairs of leg portions, said first pair of leg portions having integral portions for entering an overlapping lower marginal side portion of an upper solar panel structure extending integrally from the free ends thereof in opposite directions and in generally longitudinally aligned relation with respect to one another, and means for securing the free ends of said second pair of leg portions together providing an opening therethrough for receiving a fastener securing the mounting assembly to the building surface.

9. A solar panel installation as defined in claim 8 wherein said opening providing means comprises an elongated plate having an elongated slot formed constituting said opening, said pair of wire elements including a pair of mounting portions extending integrally from the free ends of the second pair of leg portions in opposite directions and in generally longitudinally aligned relation with respect to each other, said mounting portions being rigidly secured to said mounting plate.

10. A solar panel installation as defined in claim 9 wherein said first pair of leg portions are shorter than said second pair of leg portions.

11. A solar panel installation as defined in claim 9 wherein said opening defining means includes an elongated open loop of wire having ends formed integrally with the free ends of said second pair of leg portions, said second pair of leg portions having bowed out sections adjacent the free ends thereof.

12. A solar panel installation as defined in claim 1, 2, 3, 4, 5 or 6 wherein said mounting means includes a plurality of mounting assemblies between each panel structure and the exterior building surface, each of said mounting assemblies comprising a strip of metal including a first leg portion for engaging the building surface, a first bight portion extending from one end of said first leg portion, a second leg portion shorter than said first leg portion extending from said first bight portion in a direction parallel to said first leg portion, a second bight portion extending from said second leg portion in a direction away from said first leg portion and generally parallel with said first bight portion and a third leg portion shorter than said first leg portion extending from said second bight portion in a direction generally parallel with but opposite to the extent of said second leg portion from said first bight portion, said first leg portion having opening means in the free end section thereof extending beyond the shorter second leg portion for receiving fastener means therethrough to secure the same to the building surface, said first leg portion, said first bight portion and said second leg portion defining a first U-shaped structure for receiving therein an upper marginal side portion of a lower panel structure therein, said second leg portion, said second bight and said third portion defining a second U-shaped structure for receiving therein a lower marginal side portion of an upper panel structure in overlapping relation to the upper marginal side portion of the lower panel structure.

13. A solar panel installation as defined in claim 12 wherein said second bight portion has a central section thereof deformed outwardly to receive therethrough a securing wire for said panel structures.

14. A solar panel installation as defined in claim 2, 3, 4, 5 or 6 wherein said manifold tube means also includes a mounting assembly for sealingly securing adjacent open ends of each pair of axially aligned manifold tubes each of which includes a plurality of exterior lugs having slots extending axially therethrough, each of said coupling assemblies comprising a tubular member having opposed end portions for sealingly engaging within the open ends of the pair of manifold tubes, and a plurality lug slot entering locking straps secured at their mid-portions to the exterior periphery of the central portion of said tubular member at annularly spaced positions, each of said straps having a multiplicity of locking tabs formed between the side edges thereof and extending from one flat surface thereof to define locking surfaces facing toward the mid-portion thereof and inclined surfaces extending from the outer edges of said locking surfaces in a direction away from the mid-portion thereof to an adjacent flat surface of the strap.

15. A solar panel assembly adapted to be mounted in lapped relation with similar solar panel assemblies to form a roof or siding installation comprising
a panel structure having a multiplicity of elongated thin wall sections defining a multiplicity of parallel passages extending between the ends of said panel structure,
said multiplicity of parallel passages including a row of passages disposed in side-by-side relation between opposite sides of said panel structure, and
a manifold tube having a length generally equal to the side-by-side dimension of said panel structure extending along each end of said panel structure with its axis disposed at an angle to the side-by-side extent of said row of passages, and
means for fixedly securing each of said manifold tubes to the adjacent panel structure end so that the interior thereof is out of communicating relation with a plurality of passages in said row at each side of said panel structure and in communicating relation with the adjacent ends of the remaining passages of said row.

16. A solar panel assembly as defined in claim 15 wherein said thin wall sections include exterior side-by-side thin wall sections defining a portion of said row of passages, the exterior thin wall sections defining the remaining passages of said row having a layer of insulating material secured exteriorly thereto, said layer of insulating material having an exterior mounting surface extending in a plane generally parallel with a plane passing through the axes of said manifold tubes.

17. A solar panel assembly as defined in claim 16 wherein said layer of insulating material has central recess means formed therein opening to said mounting surface.

18. A solar panel assembly as defined in claim 17 wherein said multiplicity of passages includes a second row of passages sealed at their ends of a number generally equal to the number of passages in said first mentioned row, said multiplicity of thin wall sections including an exterior thin wall section having an outwardly arching lens-shaped cross-sectional configuration defining a part of each one of the passages of said second row.

19. A solar panel assembly as defined in claim 18 wherein said multiplicity of passages includes a corresponding third row of passages sealed at their ends between said first and second rows.

20. A solar panel assembly as defined in claim 16, 17, 18 or 19 wherein the axes of said manifold tubes are disposed at an angle of approximately 3°/0' to the side-by-side extent of said first mentioned row of passages.

21. A solar panel mounting assembly comprising a pair of side-by-side U-shaped spring wire elements for receiving an upper marginal side portion of a lower solar panel therein, said wire elements including first and second pairs of leg portions, said first pair of leg portions having integral portions for entering an overlapping lower marginal side portion of an upper solar panel extending integrally from the free ends thereof in opposite directions and in generally longitudinally aligned relation with respect to one another, and means for secring the free ends of said second pair of leg portions together providing an opening therethrough for receiving a fastener for securing the mounting device to a building surface having a vertical component of extent on which the upper and lower solar panel structures are to be installed.

22. A mounting assembly as defined in claim 21 wherein said opening providing means comprises an elongated plate having an elongated slot formed constituting said opening, said pair of wire elements including a pair of mounting portions extending integrally from the free ends of the second pair of leg portions in opposite directions and in generally longitudinally aligned relation with respect to each other, said mounting portions being rigidly secured to said mounting plate.

23. A mounting assembly as defined in claim 22 wherein said first pair of leg portions are shorter than said second pair of leg portions.

24. A mounting assembly aa defined in claim 24 wherein said opening defining means includes an elongated open loop of wire having ends formed integrally with the free ends of said second leg portions, said second pair of leg portions having bowed out sections adjacent the free ends thereof.

25. A solar panel mounting assembly comprising a strip of metal including a first leg portion for engaging a building surface on which the panel is to be installed, a first bight portion extending from one end of said first leg portion, a second leg portion shorter than said first leg portion extending from said first bight portion in a direction parallel to said first leg portion, a second bight portion extending from said second leg portion in a direction away from said first leg portion and generally parallel with said first bight portion and a third leg portion shorter than said first leg portion extending from said second bight portion in a direction generally parallel with but opposite to the extent of said second leg portion from said first bight portion, said first leg portion having opening means in the free end section thereof extending beyond the shorter second leg portion for receiving fastener means therethrough to secure the same to a building surface, said first leg portion, said first bight portion and said second leg portion defining a first U-shaped structure for receiving therein an upper marginal side portion of a lower panel structure therein, said second leg portion, said second bight and said third portion defining a second U-shaped structure for receiving therein a lower marginal side portion of an upper panel structure in overlapping relation to the upper marginal side portion of the lower panel structure.

26. A mounting assembly as defined in claim 25 wherein said second bight portion has a central section thereof deformed outwardly to receive therethrough a securing wire for said panel structures.

27. A mounting assembly as defined in claim 25 wherein said third leg portion has formed thereof a means to receive therethrough a securing wire for said panel structure.

28. A coupling assembly for sealingly securing adjacent open ends of two axially aligned manifold tubes each of which includes a plurality of exterior lugs having slots extending axially therethrough, said coupling assembly comprising a tubular member having opposed end portions for sealingly engaging within the open ends of the manifold tubes, and a plurality lug slot entering locking straps secured at their mid-portions to the exterior periphery of the central portion of said tubular member at annularly spaced positions, each of said straps having a multiplicity of locking tabs formed between the side edges thereof and extending from one flat surface thereof to define locking surfaces facing toward the mid-portion thereof and inclined surfaces extending from the outer edges of said locking surfaces in a direction away from the mid-portion thereof to an adjacent flat surface of the strap.

* * * * *